United States Patent Office 3,651,006
Patented Mar. 21, 1972

3,651,006
BINDERS CONTAINING 1,3,5-TRIOXANE FOR THE PRODUCTION OF PROCESSED WOOD MATERIALS
Bruno Sander and Heinrich Sperber, Ludwigshafen (Rhine), Ernst-Heinrich Pommer, Limburgerhof, Pfalz, and Werner Helmut Clad and Otto Wittmann, Ludwigshafen (Rhine), Germany, assignors to Badische Anilin- & Soda-Fabrik Aktiengesellschaft, Ludwigshafen (Rhine), Germany
No Drawing. Filed Jan. 19, 1968, Ser. No. 699,058
Claims priority, application Germany, Jan. 24, 1967,
B 90,865
Int. Cl. C08g 37/08, 37/24, 51/34
U.S. Cl. 260—33.2   3 Claims

ABSTRACT OF THE DISCLOSURE

Binders for the production of processed wood materials and based on mixtures of wood adhesives, wood preservatives and organic solvents which contain 1,3,5-trioxane; and processed wood materials prepared therewith.

---

The invention relates to improved binders for the production of processed wood materials which are resistant to damage by animals or attack by microorganisms.

Mainly binders based on aminoplast or phenoplast resins are used for the production of processed wood materials, such as plywood and chipboard. In order to obtain materials which are resistant to damage by animals or attack by microorganisms, wood preservatives are added to the binders and are distributed in the wood substance during or after the manufacture of the wood material. Most of the preservatives are not soluble in the binder solutions so that they are advantageously dispersed in the binder in the form of a solution in an organic solvent. It has proved to be advantageous to add to the binder containing the wood preservative, a coagulant to ensure that when the binder mxiture is heated during the production of the wood material the binder coagulates homogeneously. It is distributed on the surface while the liquid phase containing the wood perservative penetrates into the wood substance. Uniform distribution fo the wood preservative in the wood is achieved in this way. Polyalkylene oxides and adducts of ethylene oxide to long-chain alcohols or phenols have proved to be particularly suitable as coagulants. It has been found however that when using such coagulants, certain properties of the wood material, as for example its strength, are detrimentally affected.

The object of the present invention is to provide improved binders for the production of processed wood materials based on conventional wood adhesives, wood preservatives and organic solvents which have the said dsiadvantages to a lesser extent if at all. It is a particular object of the invention to provide binders of the said type which combine good fungicidal action with good strength properties and low swelling values of wood materials prepared therewith.

We have now found that binders for the production of processed wood materials based on a mixture of a synthetic wood adhesive derived from an aminoplast and/or phenoplast, a wood preservative and an organic solvent have particularly advantageous properties when the mixture also contains 1,3,5-trioxane.

We have further found that wood materials, particularly plywood and chipboard, which have been prepared in a conventional way using binders based on mixtures of synthetic wood adhesives derived from aminoplasts and/or phenoplasts and organic solvents, have particularly advantageous properties when 1,3,5-trioxane is added to the binders.

Among the synthetic wood adhesives based on aminoplasts and/or phenoplasts, urea-formaldehyde, melamine-formaldehyde or phenol-formaldehyde condensates conventionally used as wood adhesives are particularly suitable. These synthetic resins are in the form of an aqueuos solution or dispersion. For the production of processed wood materials, aqueous solutions or dispersions which contain 20 to 75% by weight of the synthetic resin or precondensate are usually employed.

Wood preservatives are intended to include substances which protect the wood material from attack by microorganisms and prevent it from being damaged by animals, praticularly insects. These substances are particularly salts of N-nitroso-N-organylhydroxylamines, preferably the calcium salt of N-nitroso - N - cyclohexylhydroxylamine, and also pentachlorophenol or salts of pentachlorophenol, particularly sodium pentachlorophenolate, hexachlorocyclohexane, and thiophosphoric esters. Mixtures of wood preservatives may aso be used.

The wood preservatives are advantageously used dissolved in organic solvents. Examples of suitable solvents are the various glycol ethers and gas oils, and also mixtures of solvents. Glycol monoalkyl ethers, as for example ethylene glycol monomethyl ether, are particularly suitable. It is advantageous to use solutions which contain 5 to 50% by weight of the wood preservative dissolved therein.

In addition to the synthetic wood adhesive, the wood preservative and the organic solvent, the binder mixtures according to the invention contain 1,3,5 - trioxane, advantageously in an amount of 1 to 60% and particularly 20 to 40% by weight, with reference to the solids content of the synthetic wood adhesive.

The binder advantageously contains (with reference to the solids content of the synthetic wood adhesive) 0.5 to 40% by weight of wood preservative, 5 to 60% by weight of an organic solvent and 1 to 60%, particularly 20 to 40%, by weight of 1,3,5-trioxane.

The amount of binder used for the production of the wood material is such that the amount of resin contained in the binder corresponds to the conventional amounts for the production of processed wood materials. Thus for example for the production of plywood an amount of binder is used such that 50 to 120 g. of solid resin is present per square meter of adhesive surface. Chipboards are prepared with such an amount of binder that 5 to 15% by weight of solid resin is present based on absolutely dry chips.

It has been found that the wood preservatives are uniformly distributed in wood materials prepared while using binders according to this invention. The processed wood materials have the same or better strength properties and lower swelling values than those obtained without wood preservatives according to this invention. Binders according to this invention thus offer an advantage over prior art binders which contain wood preservatives.

The invention is further illustrated by the following examples in which parts and percentages are by weight.

EXAMPLE 1

100 parts of a wood adhesive based on an urea-formaldehyde condensate (molar ratio 1:1.6) which contains 50% of solids in aqueous solution is mixed with 0.85 part of ammonium chloride and 0.85 part of urea which are dissolved in 8.3 parts of water and with 12.5 parts of a solution containing 10% of the calcium salt of N-nitroso-N-cyclohexylhydroxylamine (fungicide), 60% of ethylene glycol monomethyl ether and 30% of 1,3,5-trioxane.

Testing the binder for fungal attack

Wood chips are glued with the binder mixture of Example 1, the amount of binder used in each case being such that 8 parts of resin (dry weight) is present for 100 parts of chips.

The chips coated with binder are pressed at a temperature of 150° C. into chipboards having a thickness of 18 mm.

To determine resistance to mold chipboard test specimens having the dimensions 25 mm. x 17 mm. x 10 mm. are placed in Petri dishes on a 5% biomalt nutrient agar which has been artificially infected with spores of the mold *Aspergillus niger* or *Trichoderma viride*. The Petri dishes containing the specimens are incubated for a period of fourteen days at a temperature of 30° C., after which the extent of fungal development on the specimens and the intensity of fungus growth on the nutrient agar are assayed.

To determine resistance to wood-destroying fungi, test specimens of the same size as specified above are placed on slabs of biomalt nutrient agar which are covered with the wood-destroying fungus *Coniophora cerebella*. After incubating the dishes at 22° C. for four weeks, the extent of fungus development on the test specimens is assayed. The results are collected in Table 1 in which the following abbreviations are used:

AN(TS) = Extent of development of *Aspergillus niger* on test specimen after fourteen days
AN(NA) = Extent of development of *Aspergillus niger* on nutrient agar after fourteen days
TV(TS) = Extent of development of *Trichoderma viride* on test specimen after fourteen days
TV(NA) = Extent of development of *Trichoderma viride* on nutrient agar after fourteen days
Coniophora = Extent of development of *Coniophora cerebella* on test specimen after four weeks
Binder 1 = Binder according to Example 1
Control = without fungicide solution
(−) = Test specimen free from fungus
(+) = Traces of fungus development
(++) = Vigorous fungus development
(+++) = Uninhibited fungus development

TABLE 1

| Test specimen glued with— | AN(TS) | AN(NA) | TV(TS) | TV(NA) | Coniophora |
|---|---|---|---|---|---|
| Binder 1 | (−) | (+++) | (+) | (++) | (−) |
| Control | (+++) | (+++) | (+++) | (+++) | (+++) |

EXAMPLES 2 AND 3 WITH COMPARATIVE EXPERIMENTS

Testing the binders for tensile strength and swelling (a) Chipboards are prepared with the binder mixture of Example 1. Transverse tensile strength and swelling in thickness are determined on test specimens.

For comparison, the transverse tensile strength and swelling in thickness are also determined on chipboards which have been prepared with a fungicide solution and which contain an equal amount of an adduct of 32 moles of ethylene oxide to a fatty alcohol (sixteen to eighteen carbon atoms) instead of trioxane.

(b) Transverse tensile strengths are also determined on test chipboards which have been obtained using a binder based on a phenol-formaldehyde condensate and the abovementioned fungicide solutions (corresponding to the example). The results of determining transverse tensile strength and swelling in thickness when 1,3,5-trioxane or the above specified ethylene oxide adduct is added are collected in Table 2 in which the following abbreviations are used:

WG = wood adhesive
UF = urea-formaldehyde condensate
PF = phenol-formaldehyde condensate
Additive = Additive in fungicide solution
Trioxane = 1,3,5-trioxane
Adduct = adduct of 32 moles of ethylene oxide to fatty alcohol
TTS20 (100) = Transverse tensile strength in kg./sq. cm.
Swelling = swelling in thickness in percent after twenty-four hours (matured boards)

TABLE 2

| WG | Additive | TTS20 | TTS100 | Swelling |
|---|---|---|---|---|
| UF | | 5.8 | | 15.0 |
| UF | Trioxane | 5.9 | | 11.4 |
| UF | Adduct | 4.6 | | 12.7 |
| PF | | 5.8 | 2.5 | 13.6 |
| PF | Trioxane | 6.5 | 3.0 | 9.2 |
| PF | Adduct | 4.5 | 1.4 | 10.5 |

We claim:
1. A binder for the production of processed wood materials consisting essentially of a mixture of
   (a) a synthetic wood adhesive selected from the group consisting of urea-formaldehyde, melamine-formaldehyde and phenol-formaldehyde condensates and mixtures thereof,
   (b) a wood preservative selected from the group consisting of salts of N-nitroso-N-organylhydroxylamine, pentachlorophenol, salts of pentachlorophenol, hexachlorocyclohexane, thiophosphoric esters and mixtures thereof,
   (c) an organic solvent selected from the group consisting of glycol ethers, gas oils and mixtures thereof, and
   (d) about 1 to 60% by weight, with reference to the solids content of said synthetic wood adhesive, of 1,3,5-trioxane.

2. A binder as claimed in claim 1 which contains 20 to 40% by weight of 1,3,5-trioxane with reference to the solids content of the synthetic wood adhesive.

3. A binder as claimed in claim 1 which contains (with reference to the solids content of the synthetic wood adhesive) 0.5 to 40% by weight of wood preservative, 5 to 60% by weight of an organic solvent and 1 to 60% by weight of 1,3,5-trioxane.

References Cited

UNITED STATES PATENTS 2,615,003 10/1952 Suen et al. ........... 260—17.3
2,304,431 12/1942 Walker ............. 260—67 FP
3,313,766 4/1967 Lorentz et al. ........ 260—59

FOREIGN PATENTS 1,472,794 1/1967 France .............. 260—59

OTHER REFERENCES

Chem. Abst.: vol. 53, 22711h, Schmitz-Hillebrecht et al., "Molded Bodies . . . Preservatives."
Chem. Abst.: vol. 66, 20165y, Wilhelm et al., "Impregnation . . . Chips."
Belgian patent (Derwent) 678,701, "Binding Agents," Farbwerke Hoechst, Report No. 40/66, I. Plastics, Metal Finishing, p. 2.

WILLIAM H. SHORT, Primary Examiner
E. WOODBERRY, Assistant Examiner

U.S. Cl. X.R.
260—17.2, 17.3, 29.3, 29.4, 30.4 N, 30.4 R, 57 R, 59, 67.6 R